US007532882B2

(12) United States Patent
Owen et al.

(10) Patent No.: US 7,532,882 B2
(45) Date of Patent: *May 12, 2009

(54) METHOD AND SYSTEM FOR AUTOMATICALLY CONFIGURING ACCESS CONTROL

(75) Inventors: Russell Owen, Wateroo (CA); Neil Adams, Waterloo (CA); Timothy R. Tyhurst, Kitchener (CA)

(73) Assignee: Research In Motion Limited, Waterloo (CA)

( * ) Notice: Subject to any disclaimer, the term of this patent is extended or adjusted under 35 U.S.C. 154(b) by 106 days.

This patent is subject to a terminal disclaimer.

(21) Appl. No.: 11/550,160

(22) Filed: Oct. 17, 2006

(65) Prior Publication Data

US 2007/0207777 A1 Sep. 6, 2007

Related U.S. Application Data

(63) Continuation of application No. 10/786,031, filed on Feb. 26, 2004, now Pat. No. 7,142,848.

(51) Int. Cl.
*H04M 1/00* (2006.01)

(52) U.S. Cl. .................. 455/418; 455/419; 455/420; 709/217

(58) Field of Classification Search ... 455/414.1–414.2, 455/403, 422.1, 418–420, 425, 550, 556.2, 455/550.1; 709/203, 229, 231, 217
See application file for complete search history.

(56) References Cited

U.S. PATENT DOCUMENTS

| 6,883,000 B1 * | 4/2005 | Gropper ............... 707/10 |
| 7,178,144 B2 * | 2/2007 | Melchione et al. ......... 717/172 |
| 2002/0173295 A1 | 11/2002 | Nykanen et al. |
| 2003/0092434 A1 | 5/2003 | Irisawa |
| 2003/0100297 A1 | 5/2003 | Riordan et al. |
| 2003/0154265 A1 | 8/2003 | Raffaele et al. |
| 2003/0177248 A1 | 9/2003 | Brown et al. |
| 2003/0181196 A1 | 9/2003 | Davidov et al. |

(Continued)

FOREIGN PATENT DOCUMENTS

WO　　WO 9957866　　11/1999

(Continued)

OTHER PUBLICATIONS

Norton—Software Configuration retrieved from the Internet; Feb. 10, 2002; <http://www.hackfix.org/software/configure/norfire.html>.

*Primary Examiner*—Kamran Afshar
(74) *Attorney, Agent, or Firm*—Ridout & Maybee LLP

(57) ABSTRACT

A method for automatically configuring an access control point based upon the network resource requirements of an application. The installation of a new application on a mobile device or other user device is accompanied, before, during, or after installation, with the distribution of access control information. An access control point blocks communications based upon access rules. An access update module modifies or sets the access rules based upon the access control information. The access control point and the access update module may be located within the mobile device, within an associated wireless connector system, or in other locations within the mobile communication system. The setting or resetting of the access rules based upon the access control information may be triggered during installation, modification, or removal of the application.

7 Claims, 4 Drawing Sheets

U.S. PATENT DOCUMENTS

| | | |
|---|---|---|
| 2003/0217171 A1 | 11/2003 | Von Stuermer et al. |
| 2004/0082361 A1 | 4/2004 | Rajagopalan |
| 2004/0085970 A1 | 5/2004 | Kang |
| 2004/0088550 A1 | 5/2004 | Maste |
| 2004/0127190 A1 | 7/2004 | Hansson et al. |
| 2004/0152457 A1 | 8/2004 | Goldstein et al. |
| 2005/0075115 A1* | 4/2005 | Corneille et al. ......... 455/414.1 |
| 2005/0101309 A1 | 5/2005 | Croome |
| 2005/0215236 A1 | 9/2005 | Myka et al. |

FOREIGN PATENT DOCUMENTS

| | | |
|---|---|---|
| WO | WO 0133889 | 5/2001 |
| WO | WO 03088699 | 10/2003 |

* cited by examiner

METHOD AND SYSTEM FOR AUTOMATICALLY CONFIGURING ACCESS CONTROL

CROSS-REFERENCE TO RELATED APPLICATIONS

The present application is a continuation of application Ser. No. 10/786,031, filed Feb. 26, 2004, and owned in common herewith.

FIELD OF THE INVENTION

The present invention relates to access control points in a communications network and, in particular, to automatically configuring access control points based upon the needs of an application.

BACKGROUND OF THE INVENTION

Many of the mobile devices available today provide complex functionality far beyond simple voice communications. For example, many devices enable a user to access remote servers or sites over a public network, like the Internet. These devices may be web-enabled and may operate browser software to permit users to access remote web sites on the mobile device. Other devices allow users to operate applications and even install new applications downloaded from remote sites over the public network.

This greater level of functionality, especially the access to the public network, presents particular security issues. For example, access to the public network renders the mobile device vulnerable to viruses, Trojan horses, and other damaging communications from remote sites. Accordingly, most mobile communications systems include one or more access control points, or firewalls, that may block certain communications or transmissions from remote sites to the mobile devices. The access control points make decisions regarding which communications to allow and which to block based upon access rules.

The use of access control points presents a problem for legitimate applications installed and operating on a mobile device because the application may require access to network resources through the public network. Communications from these resources may be blocked entirely by the access control points or the user may be asked whether access should be granted. Many users will deny access to these communications since they are unaware that the application requires them and are unfamiliar with the source of the communications.

This problem is especially acute in the case of provisioning of an application by an administrator. When an application is pushed out to a mobile device for installation, the user may be unaware it has been installed and will be unlikely to agree to receive communications from remote network resources to enable the application to operate properly.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

Figure 1:
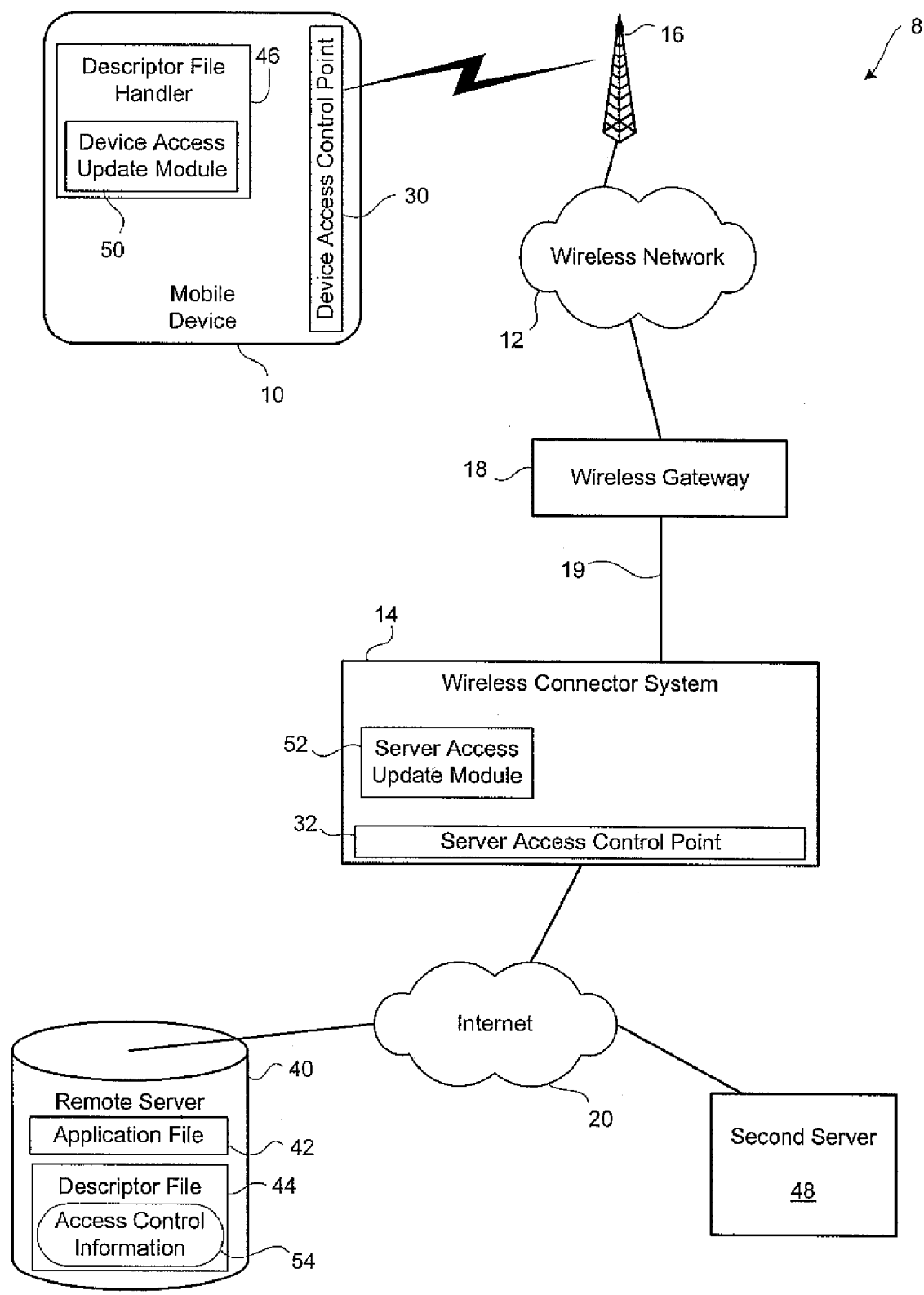
FIG. 1 shows an embodiment of a mobile device communications system in block diagram form.

The present application provides a method for automatically configuring an access control point based upon the needs of the application, as provided through an associated descriptor file. The associated descriptor file provides access control information which can be used by an access update module to reconfigure or set the access control point so as to permit communications from required network resources to a user device running the application.

In one aspect, the present application provides, in an access update module, a method of automatically configuring an access control point, the access control point allowing or blocking transmissions between network resources and an application on a user device based upon access rules. The method includes the steps of receiving and reading access control information associated with the application and setting the access control rules based upon the access control information.

In another aspect the present application provides a computer program product having a computer-readable medium tangibly embodying computer executable instructions for automatically configuring an access control point, the access control point allowing or blocking transmissions between network resources and an application on a user device based upon access rules. The computer executable instructions create an access update module and include computer executable instructions for receiving and reading access control information associated with the application, and computer executable instructions for setting the access control rules based upon the access control information.

In a further aspect, the present application provides, in an access update module, a method of automatically configuring an access control point. The access control point allows or blocks transmissions between remote network resources and a new application on a user device based upon access rules. The method includes the steps of downloading the new application for installation on the user device, wherein the new application is configured to access the remote network resources during operation; installing the new application on the user device; receiving and reading access control information associated with the new application; and setting the access control rules based upon said access control information in order to permit communications between the new application and the remote network resources In yet a further aspect, the present application provides a computer program product having a computer-readable medium tangibly embodying computer executable instructions for automatically configuring an access control point. The access control point allows or blocks transmissions between remote network resources and an application on a user device based upon access rules. The automatic configuration of the access point occurs in connection with downloading and installing the new application on the user device, and the new application is configured to access the remote network resources during operation. The computer executable instructions create an access update module including computer executable instructions for receiving and reading access control information associated with the application, and computer executable instructions for setting the access control rules based upon said access control information in order to permit communications between the new application and the remote network resources.

In another aspect, the present application provides a user device having an access control point, the access control point allowing or blocking transmissions between remote network resources and a new application on the user device based upon access rules. The user device includes means for downloading the new application for installation on the user device, wherein the new application is configured to access the remote network resources during operation, means for installing the new application on the user device, and means for receiving and reading access control information associated with the new application. The user device also includes means for setting the access control rules based upon said access control information in order to permit communications between the new application and the remote network resources.

The following description of one or more specific embodiments of the invention does not limit the implementation of the invention to any particular computer programming language or system architecture. The present invention is not limited to any particular operating system, network configuration, user device architecture, or computer programming language.

Some of the embodiments described below involve a user device architecture in which a plurality of mobile devices connect to a wireless connector system through a wireless network. The wireless connector system is connected, directly or indirectly, to the Internet and allows the mobile devices to send and receive communications over the Internet. It will be appreciated that aspects of the present invention need not be based upon such an architecture and that the present invention is not limited to mobile devices or wireless communications. The present invention may be embodied within wired or wireless network architectures using a variety of user devices, including mobile devices, handheld devices, personal computers, and other user terminals.

Reference is first made to FIG. 1, which shows a block diagram of an embodiment of a mobile device communications system 8. The system 8 includes a mobile device 10, a wireless network 12, and a wireless connector system 14. The mobile device 10 sends and receives wireless communication, including data and possibly also voice communication. Depending on the functionality provided by the device, in various embodiments the device may be a data communication device, a multiple-mode communication device configured for both data and voice communication, a mobile telephone, a PDA (personal digital assistant) enabled for wireless communication, or a computer system with a wireless modem, among other things.

The mobile device 10 sends and receives wireless communications with an antenna 16 coupled to the wireless network 12. The wireless network 12 includes a number of antennas 16 distributed in various locations for sending and receiving wireless communications with the mobile device 10.

In one embodiment, the wireless network 12 is coupled to a wireless gateway 18 or relay. The wireless gateway 18 interfaces between a plurality of wireless connector systems, including a wireless connector system 14, and a plurality of mobile devices, including the mobile device 10. The wireless gateway 18 routes data packets between the various wireless connector systems and their associated mobile devices over the wireless network 12. Accordingly, communications sent via the mobile device 10 are received by the antenna 16 and transported via the wireless network 12 to the wireless gateway 18. The wireless gateway 18 forwards the communication to the wireless connector system 14. Communications sent from the wireless connector system 14 are received by the wireless gateway 18 and transported via the wireless network 12 to the mobile device 10.

The wireless connector system 14 is coupled to a wireless gateway 18 for receiving and sending communications with the mobile device 10. In one embodiment, the wireless gateway 18 and the wireless connector system 14 are connected via a dedicated link 19. Typically, the wireless connector system 14 is dedicated to managing communications to and from a set of mobile devices 10. The wireless connector system 14 may include a corporate Intranet and multiple servers, including an e-mail server and an Internet server.

The wireless connector system 14 is also connected to a public network, which in some embodiments is the Internet 20. Therefore, data communications, such as e-mail messages, may be received by the wireless connector system 14 through the Internet 20 from remote locations and may be redirected from the wireless connector system 14 to the mobile device 10. In this regard the wireless connector system 14 may comprise an electronic mail server such as, for example, a server running Microsoft™ Exchange Server or other commercially available mail server software.

The wireless connector system 14 also allows the mobile device 10 to send and receive communications other than e-mail over the Internet 20. For example, the mobile device 10 may operate web browser software for receiving HTML pages from remote web sites over the Internet 20. The mobile device 10 may also operate applications that send and receive data with remote sites over the Internet. For example, the mobile device 10 may operate an application that consumes a Web Service to monitor stock prices or other on-line content.

Figure 2:
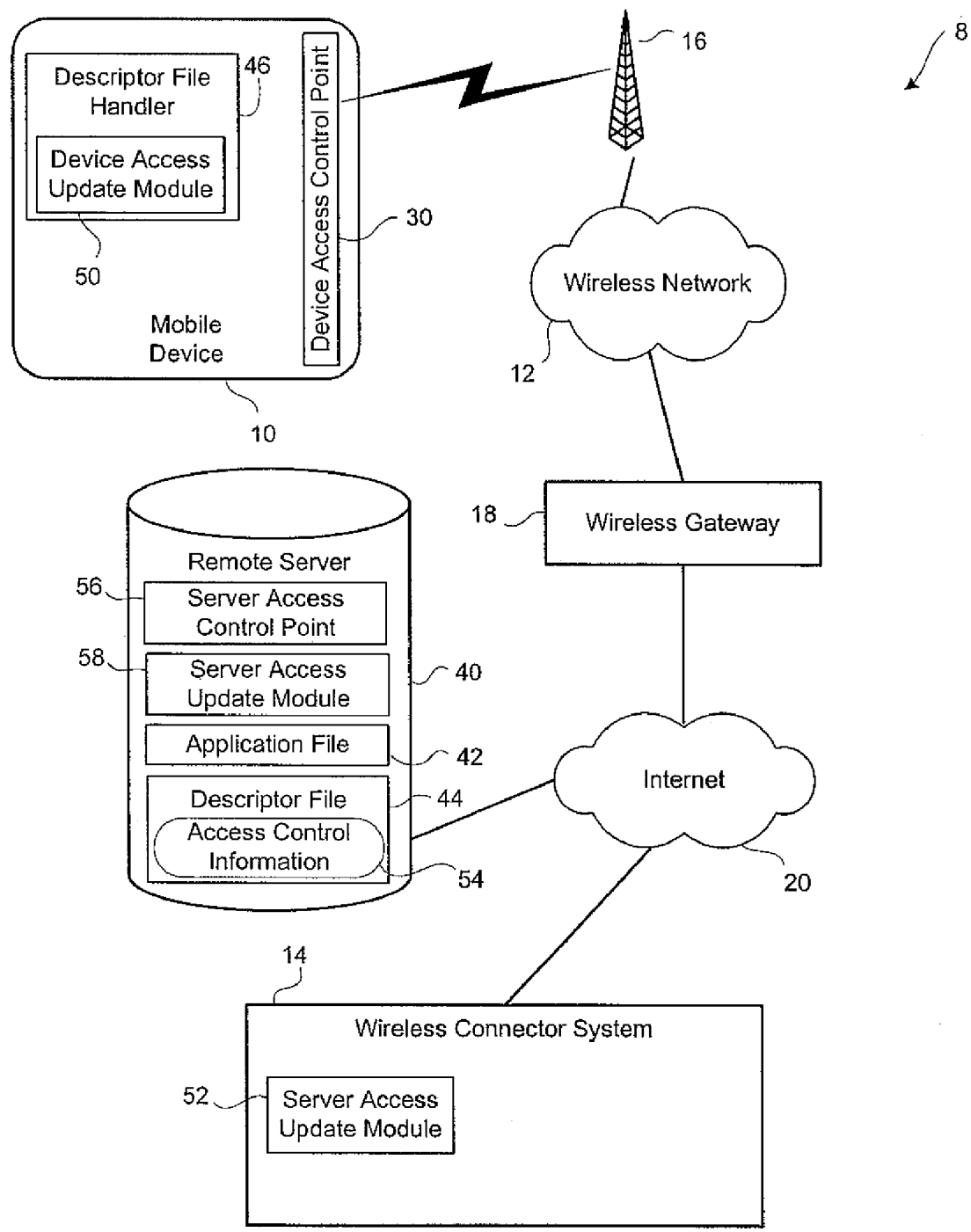
FIG. 2 shows another embodiment of a mobile device communications system in block diagram form.

Reference is now made to FIG. 2, which shows a block diagram of an alternative embodiment of the mobile device communications system 8. In the embodiment shown in FIG. 2, the wireless gateway 18 is coupled to the wireless connector system 14 through the Internet 20. In this embodiment, the mobile device 10 has direct access to the Internet 20 without going through the wireless connector system 14.

Referring now to FIGS. 1 and 2, the mobile device 10 includes a device access control point 30. The device access control point 30, which may be referred to as a "firewall", includes a set of device access rules for determining whether communications are authorized to be sent by or received by the mobile device 10. The device access control point 30 is intended to prevent unauthorized or unreliable sources from transmitting to the mobile device 10, and to prevent the mobile device from transmitting to unauthorized or unreliable remote sites. This is, partly, to prevent the receipt of viruses and other destructive communications and to prevent the disclosure of confidential or sensitive information. Access to the mobile device 10 may also be restricted so as to prevent other attacks and security problems. The device access rules typically prevent the receipt or transmission of data packets from or to remote sites over the Internet 20 that may be deemed questionable or unreliable.

The device access rules for the device access control point 30 may block access to communications originating from or intended for a particular IP address, or they may grant access to communications originating from or intended for a particular IP address and block all others. Other communications may be blocked by the device access rules based upon their type or based upon their content. For example, certain types of files, such as executables, may be deemed to be a security risk. The device access rules may be configured to seek user confirmation to accept communications from a questionable source. In some embodiments, when a communication is received from an IP address that the device access rules deem questionable or unverified, then the user may be asked whether or not they wish to accept the communication. Many users will decline since they are unfamiliar with the source of the communication.

The wireless connector system 14 in the embodiment shown in FIG. 1 similarly includes a server access control point 32. The server access control point 32 acts as a firewall for communications received by the wireless connector system 14 from the Internet 20 intended for transmission to the mobile device 10. The server access control point 32 includes a set of server access rules that govern whether or not communications received from the Internet 20 are granted access or are blocked. The server access rules may include global rules applicable to communications intended for any mobile device 10 in the system 8, and they may include specific rules related to a particular mobile device 10.

A remote server 40 is connected to the Internet 20. In one embodiment, shown in FIG. 2, the remote server 40 may include a remote server access control point 56. The remote server access control point 56 is a firewall for communications received by or sent by the remote server 40.

The remote server 40 may contain an application file 42 and a corresponding descriptor file 44. The application file 42 is available for download over the Internet 20 from the remote server 40 to a user terminal so as to configure and install an application at the user terminal. When a user at a user terminal connected to the Internet 20 determines to download and install the application, the user terminal first receives the descriptor file 44. The descriptor file 44 contains information regarding the application and the operating requirements of the user terminal to successfully install and operate the application. The descriptor file 44 may, for example, specify particular versions of operating systems, platforms, or related programs that are necessary for the application to operate properly. The descriptor file 44 may also specify the memory and processor requirements associated with the application, and may contain a link to, or an address for, the application file 42.

In one embodiment, based upon the descriptor file 44 the user terminal determines if it meets the system requirements. The user terminal may open a dialogue window to notify the user if any system requirements are not met or to ask the user whether or not to continue with the downloading and installation of the application. The dialog window may also ask the user whether to accept communications from/to remote resources, or to warn the user that communication with those remote resources may be required for the application to operate correctly. If the user agrees to continue with the installation, then the user terminal downloads the application file 42 based upon the address information contained in the descriptor file 44. The application file 42 is then installed on the user terminal.

By way of example, applications developed using the Java programming language include a Java Archive (JAR) file and a Java Application Descriptor (JAD) file. The JAD file is an extensible text file with a number of name:value fields specifying certain system parameters or requirements related to the application, which can be installed using the JAR file.

Referring still to FIGS. 1 and 2, a user of the mobile device 10 may locate the remote server 40 and choose to download the descriptor file 44 in order to have an application installed on the mobile device 10. The mobile device 10 includes a descriptor file handler 46 for handing the received descriptor file 44. The descriptor file handler 46 determines whether or not the system requirements specified in the descriptor file 44 are met by the mobile device 10, seeks user confirmation of the download and installation, if necessary, and triggers the downloading of the application file 42 from the remote server 40.

Once installed and operating, the application may require access to resources from the Internet 20. These resources may be located at the remote server 40 or at a second server 48. Communications to or from the remote server 40 or the second server 48 may be blocked at the device access control point 30 or at the server access control points 32 or 56 unless the respective access rules are properly configured to permit communications between the mobile device 10 and the remote server 40 and/or the second server 48.

In accordance with one embodiment of the present invention, the descriptor file 44 includes access control information 54. The access control information 54 may include information regarding the remote resources that the application requires so as to ensure that access to these resources is not blocked by firewalls. In one embodiment, where the descriptor file 44 comprises a JAD file, the access control information 54 includes textual access control information, such an authorized IP address, domain, port, or other identifier, to which access should be granted by the device access control point 30 and the server access control point 32. In one embodiment, the access control information 54 in a JAD file may take the following form:

Server-Access: http://DailyQuotes.traders.com:8080
Server-Access: http://DailyTrade.traders.com:8080

In another embodiment, the access control information 54 is stored directly in the application file 42. In yet another embodiment, the access control information 54 is stored in a separate file unrelated to the descriptor file 44. In the latter embodiment, it is contemplated that the separate file with the access control information 54 would be forwarded to the mobile device 10 after successful installation of the application.

The access control information 54 allows the mobile device 10 to update its device access rules to ensure the application is able to receive communication from the resources it requires, such as the remote server 40 and/or the second server 48.

The mobile device 10 includes a device access update module 50. The device access update module 50 sets or reconfigures the device access control point 30 based upon the access control information 54 in the descriptor file 44. In particular, the device access update module 50 modifies existing device access rules or establishes new device access rules in accordance with the access control information 54. For example, if the access control information 54 indicated that a particular resource, having a particular address, was needed by the application, then the device access Update module 50 may configure the device access rules to ensure that communications from the particular resource are permitted.

In one embodiment, the device access update module 50 is resident on the mobile device 10 as a part of the descriptor file handler 46. In another embodiment, the device access update module 50 is provided through code in the application file 42, such that when the application is downloaded and installed the device access update module 50 is invoked.

The device access update module 50 may trigger the changes to the device access rules once the user has confirmed that he or she wishes to download the application file 42 and install the application. It may alternatively trigger the changes once the application has been successfully installed on the mobile device 10. Accordingly, the user or an administrator need not modify the device access rules manually. The mobile device 10 automatically reconfigures its device access control point 30 to accommodate the new application based upon the access control information 54 for the application.

It will be understood that certain authorization and certification processes may accompany an embodiment of the present invention to ensure that access control point rules are not altered by an authorized source. The mobile device 10, the wireless connector system 14, and the remote server 40 establish a trust relationship prior to permitting the alteration of access control rules. This trust relationship may be established using standard cryptographic techniques, such as public key encryption and digital signatures.

In one embodiment shown in FIG. 1, the wireless connector system 14 includes a server access update module 52. The server access update module 52 configures the server access control point 32 to permit communications from remote resources, such as the remote server 40 and/or second server 48, to the mobile device 10. In particular, the server access update module 52 modifies or updates the server access rules based upon the access control information 54. The server access update module 52 may obtain the access control information 54 in a variety of ways. In one embodiment, where the access control information 54 is included in the descriptor file 44, the server access update module 52 may read the access control information 54 when the descriptor file 44 is downloaded to the mobile device 10 through the wireless connector system 14. In another embodiment, the descriptor file handler 46 on the mobile device 10 reads the access control information 54 and sends a message to the server access update module 52 that includes the access control information 54. In yet another embodiment, the remote server 40 may send the server access update module 52 a message containing the access control information 54 once the mobile device 10 installs the application. Those of ordinary skill in the art will appreciate that there are a variety of methods for communicating the access control information 54 to the server access update module 52.

In another embodiment, as shown in FIG. 2, the remote server 40 includes a remote server access update module 58 for altering the access control rules for the remote server access control point 56. As with the above-described server access update module 52, there are a variety of methods of ensuring that the remotes server access update module 58 is provided with the access control information 54 at the appropriate time. In one embodiment, the mobile device 10 sends a message to the remote server 40 to indicate that the application has been successfully installed, and in response the remote server 40 invokes the remote server access update module 58 and provides it with the access control information 54.

In the context of the system 8, there are at least two download scenarios. In one scenario, the user of the mobile device 10 initiates the downloading of an application to the mobile device 10. This may be termed a "pull" event. A "push" event is the second scenario, in which an administrator may initiate the downloading of an application to the mobile device 10 without user involvement. The administrator may be the administrator of the wireless connector system 14. It will be appreciated that in the "push" event, the descriptor file 44 is often not sent to the mobile device 10. In the case of the "push event" the application file is pushed out to the mobile device 10 for installation and the access control information 54 may be sent prior to the application file 42, embedded in the application file 42, or afterwards in a separate control message. It will also be appreciated that in the case of a "push" event, appropriate authorizations and certifications should be employed to ensure that applications are not pushed out to device by an unauthorized source.

Figure 3:
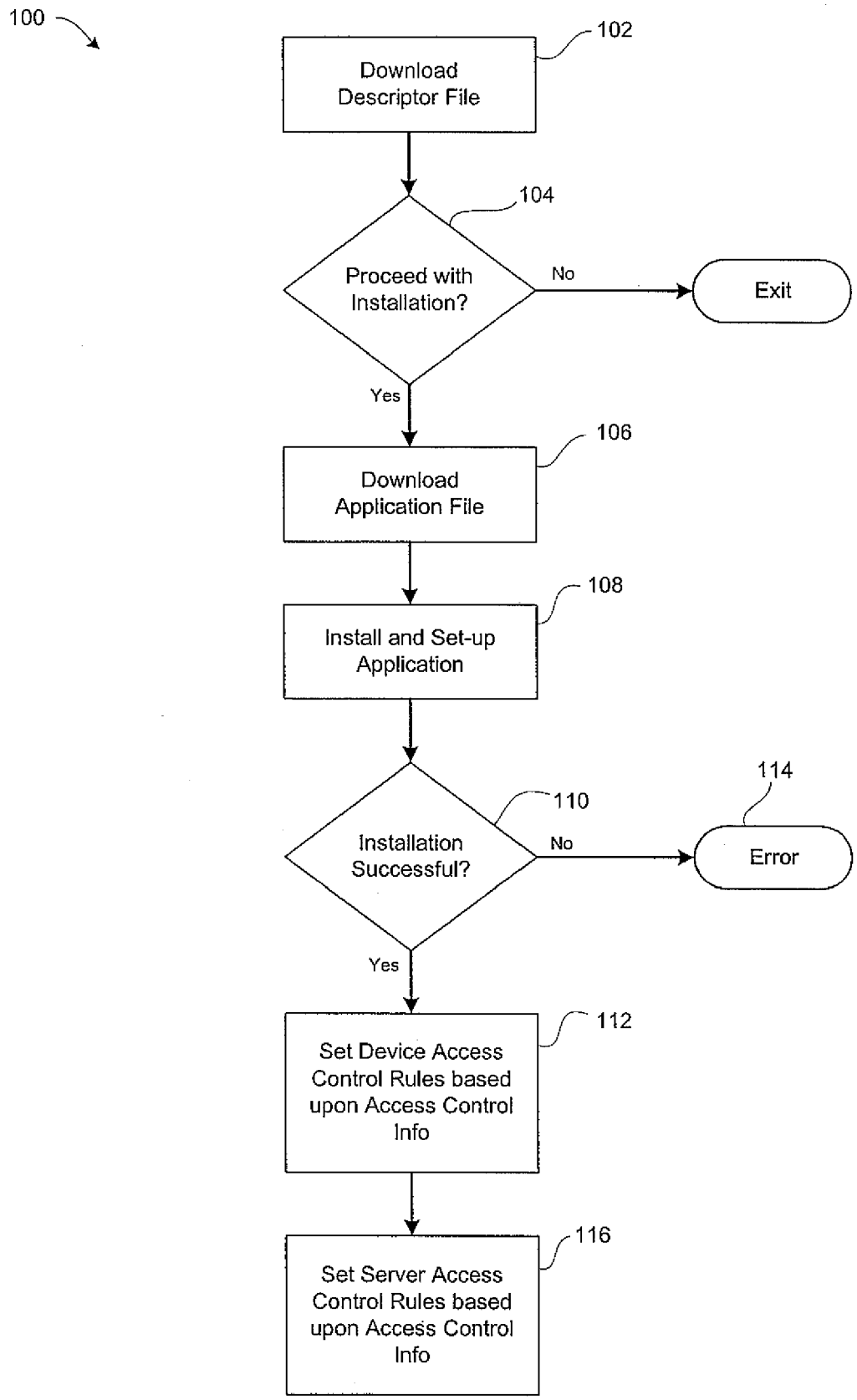
FIG. 3 shows, in flowchart form, a method for automatically configuring access control for the mobile device communications system.

Reference is now made to FIG. 3, which shows, in flow-chart form, a method 100 of automatically configuring access control for the mobile device communications system 8 (FIG. 1). The method 100 begins with the receipt of a downloaded descriptor file 44 (FIG. 1) in step 102. The descriptor file 44 includes access control information 54 (FIG. 1) regarding the remote resources utilized by the application. Step 102 includes the receipt of the descriptor file 44 by the wireless connector system 14 (FIG. 1) and the forwarding of the descriptor file 46 from the wireless connector system 14 to the mobile device 10 (FIG. 1) over the wireless network 12 (FIG. 1). In one embodiment, the wireless connector system 14 recognizes that it has received a descriptor file, which implies that a user may install a new application on a mobile device, and as a result the wireless connector system 14 invokes the server access update module 52 (FIG. 1) to read the access control information 54 and to await confirmation that the installation of the application is going to proceed or has been completed.

In step 104, the descriptor file handler 46 at the mobile device 10 reads the descriptor file 44 and evaluates whether the application can be downloaded and installed on the mobile device 10 given the system requirements set out in the descriptor file 44. The descriptor file handler 46 may also query the user regarding whether the user wishes to proceed with the downloading and installation of the application. If the user declines, or if the mobile device 10 fails to meet the system requirements, then the method 100 ends. Otherwise, the method 100 proceeds to step 106.

In step 106, the descriptor file handler 46 downloads the application file 42 to the mobile device 10. Then, in step 108, the application is installed and set-up on the mobile device 10 based upon the application file 42.

Following installation, the method 100 proceeds to step 110, wherein an evaluation is made as to whether or not the installation and set-up was successful. If not, then in step 114 an error message or other notification is generated. If the installation has occurred successfully, then in step 112 the descriptor file handler 46, and more particularly the device access update module 50 (FIG. 1), modifies the device access rules in accordance with the access control information 54 from the descriptor file 46. Similarly, in step 116, the server access update module 52 modifies the server access rules in accordance with the access control information 54 from the descriptor file 46. In one embodiment, the device access update module 50 sends a message to the server access update module 52 to confirm that the application has been installed, and in response the server access update module 52 implements the changes to the server access rules.

It will be understood that the updates to the device access rules and the server access rules by the access update modules 50, 52 may occur at other times. For example, the update may occur once the user or administrator has confirmed the downloading of the application file 42 will proceed, instead of waiting until the installation is complete. In some embodiments, the update may occur prior to downloading the application file 42, as described below.

There are at least two other scenarios in which the device and server access rules may be changed. The first is as a result of a modification to an existing application. For example, the address of a database or other network resource used by the application may change. Accordingly, a change may be required to be made to the access rules to ensure communications to the mobile device 10 from this new address are permitted. In these circumstances, a message may be sent to the mobile device 10. The message may contain updated access control information 54 including information pertaining to the modification required of the access rules to permit communications from the new address of the network resource. In one embodiment, the message may comprise the descriptor file 44. Because the application need not be installed, the message may, in these circumstances, contain a flag or other setting indicating that downloading or installation of the application file 42 is not to occur and that the change to the access rules may be implemented by the device access update module 50 and the server access update module 52 immediately. Accordingly, the device access update module 50 and the server access update module 52 update the device access rules and the server access rules, respectively, based upon the access control information 54 at the time the update message is received.

The second scenario may involve the removal of an application. For example, the administrator or other third party may elect to revoke the user's ability to utilize the application. Accordingly, the administrator may send a removal message having a flag or other setting for triggering the initiation of an uninstall process. Alternatively, the message may trigger the download of a new application file 42 that operates to remove the previously installed application. Howsoever the removal or disablement of the application is facilitated, the message pushed out to the mobile device 10 includes access control information 54 for modifying the device and server access rules to reflect the fact that the application will no longer require access to the remote server 40 and/or the second server 48. Therefore, the device access update module 50 and the server access update module 52 modify the device access rules and the server access rules, respectively, to implement the changes; in many cases, essentially undoing the changes to the access rules that were previously made when the application was installed. As described above, the update modules 50, 52 may be triggered to implement the changes upon receipt of the message or at any other appropriate time.

Figure 4:
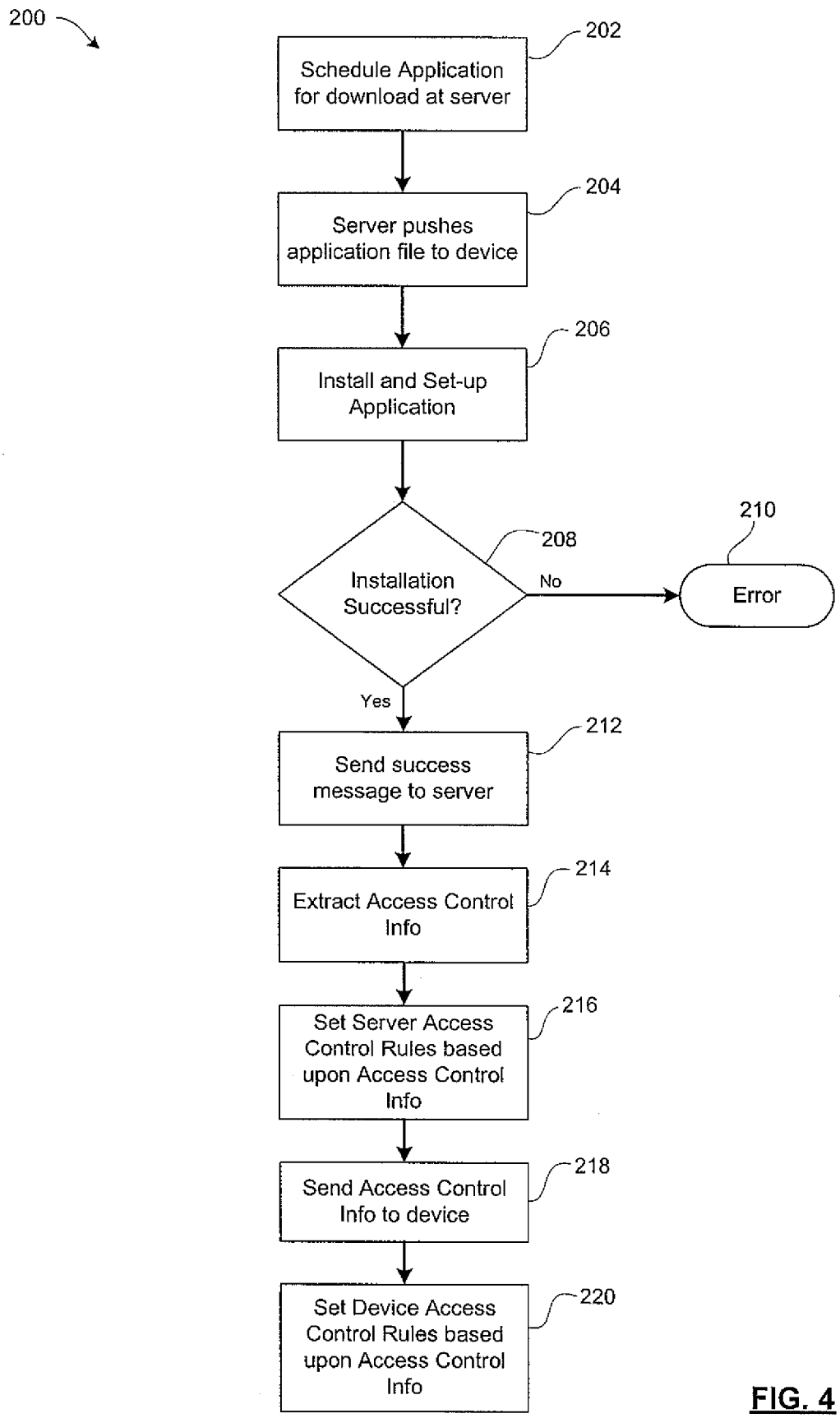
FIG. 4 shows, in flowchart form, another method for automatically configuring access control for the mobile device communications system.

Reference is now made to FIG. 4, which shows, in flowchart form, a method 200 of automatically configuring access control for the mobile device communications system 8 (FIG. 1), in a "push" case. The method 200 begins in step 202 where the application is scheduled for distribution to one or more mobile devices 10. In step 204, the remote server 40 pushes the application file 42 out to the mobile device 10. In step 206, the mobile device 10 installs the application.

An assessment is made as to whether or not the installation was successful in step 208 and, if not, then an error message is generated in step 210. If installation was successful, then the method 200 proceeds to step 212 where a message is sent to the remote server 40 to indicate that installation was successful. If the application file 42 had access control information 54 embedded within it, then this information is extracted and included in the message to the remote server 40.

At the remote server 40, in step 214 the remote server access update module 58 extracts the access control information 54 from the message, if there any, or extracts the access control information 54 from a file or object stored locally and associated with the application file 42. In step 216, the remote server access update module 58 configures the remote server access control rules based upon the access control information 54.

Once the remote server 40 has configured its remote server access control point 56, then in step 218 it sends a message to the mobile device 10 that may include the access control information 54. It will be understood that the message need not include the access control information 54 if this information was embedded in the application file 42 that was originally distributed to the mobile device 10. In step 220, upon receipt of the message the device access update module 50 configures the device access control rules based upon the access control information 54.

The programming of the above-described device access update module 50 and server access update module 52 will be within the understanding of one of ordinary skill in the art of computer programming, having regard to the foregoing description. The present invention is not limited to the implementation of the access update modules 50, 52 in any particular computer programming language.

Although the above embodiments describe the present invention in the context of mobile devices using a wireless network, those of ordinary skill in the art will appreciate that it is not so limited. In some embodiments, the mobile devices may be user terminals, such as desktop or laptop computers, and may be coupled to a wireless connector system over a wired or wireless network. The network may include a LAN, WAN, MAN, or other network. In some embodiments, access control points may be provided at each device or terminal. In other embodiments, the only access control point may be at the wireless connector system to block communications incoming from the Internet. Various other configurations may be implemented in accordance with the present invention provided there is at least one access control point and a corresponding access update module for dynamically configuring the access rules for the access control point based upon a received descriptor file.

Those of ordinary skill in the art will appreciate that references to a "module", such as the server access update module 52 or the device access update module 54 are intended to encompass wide variety of possible programming mechanisms including objects, routines, Components, constraint-based systems, declarative systems, etc.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of automatically configuring access control for a mobile device communications system:
   receiving access control information regarding remote resources utilized by an application,
   downloading to the mobile device an application file associated with said application,
   installing and setting-up the application on the mobile device based upon the application file, and
   modifying access control rules in accordance with the access control information, the access control rules providing a basis for deciding which communications to allow and which communications to block between the application and the remote resources, said modifying occurring after it has been confirmed that downloading of the application file will proceed or installing is complete,
wherein said modifying further comprises modifying server access control rules in accordance with the access control information, and said modifying server access control rules further comprises sending a message to a server access update module, and responsive thereto the server access update module implementing the modification of the server access rules, and wherein receiving comprises receiving the access control information within a descriptor file, and reading the access control information from the descriptor file.

2. The method of claim 1 further comprising, following installation, evaluating whether or not the installation and set-up was successful, and, if not, generating an error message or other notification, and if the installation has occurred successfully, then performing the step of modifying.

3. The method of claim 1 wherein modifying further comprises modifying device access control rules in accordance with the access control information.

4. The method of claim 1 wherein receiving further comprises receiving the descriptor file by a wireless connector system and forwarding of the descriptor file from the wireless connector system to the mobile device over a wireless network.

5. The method of claim 4 wherein the wireless connector system invokes the server access update module to read the access control information.

6. The method of claim 5 wherein the server access update module, before modifying access control rules, awaits confirmation that the installation is going to proceed or has been completed.

7. The method of claim 1 further comprising receiving system requirements of the application and prior to downloading the application file, evaluating whether the mobile device satisfies the systems requirements such that the application can be downloaded and installed.

* * * * *